United States Patent [19]

Beckerer, Jr.

[11] Patent Number: 5,037,122
[45] Date of Patent: Aug. 6, 1991

[54] PROTECTIVE COVER FOR A TRAILER HITCH

[76] Inventor: Frank S. Beckerer, Jr., 40 Dock Rd., Milford, Conn. 06460

[21] Appl. No.: 552,314

[22] Filed: Jul. 13, 1990

Related U.S. Application Data

[63] Continuation-in-part of Ser. No. 258,648, Oct. 17, 1988, Pat. No. 4,955,968.

[51] Int. Cl.⁵ .................... B60R 21/34; B65D 65/02
[52] U.S. Cl. ..................... 280/507; 150/166; 280/511; 403/130; D9/444; D9/445
[58] Field of Search ........... 180/507, 511, 504; 150/154, 166, 167; 403/130

[56] References Cited

U.S. PATENT DOCUMENTS

| | | | |
|---|---|---|---|
| 1,410,605 | 3/1922 | Schacht | 150/166 X |
| 1,465,536 | 8/1923 | Vogt | 150/154 |
| 3,216,603 | 11/1965 | Hannon, Jr. | D9/445 |
| 3,228,445 | 1/1966 | Mayotte | 280/507 X |
| 3,327,280 | 6/1967 | Levine et al. | 150/154 |
| 3,474,930 | 10/1969 | Lerner | D9/445 |
| 3,596,926 | 8/1971 | Randall | 280/507 |
| 3,862,654 | 1/1975 | Goldberg et al. | 150/154 |
| 4,060,331 | 11/1977 | Domer et al. | 280/511 X |
| 4,170,316 | 10/1979 | La Barbera | D9/445 |
| 4,181,320 | 1/1980 | Wellborn, Jr. | 280/511 X |
| 4,383,565 | 5/1983 | Denmat | 150/154 |
| 4,738,293 | 4/1988 | Ostrom et al. | 280/507 |
| 4,955,968 | 9/1990 | Beckerer, Jr. | 280/507 |

FOREIGN PATENT DOCUMENTS

| | | | |
|---|---|---|---|
| 1407224 | 6/1965 | France | 280/507 |
| 2097306 | 3/1972 | France | 280/507 |
| 2426583 | 1/1980 | France | 280/507 |
| 2432947 | 4/1980 | France | 280/507 |
| 75363 | 7/1949 | Norway | 150/166 |

Primary Examiner—Mitchell J. Hill
Attorney, Agent, or Firm—H. Gibner Lehmann; K. Gibner Lehmann

[57] ABSTRACT

A cover for a trailer hitch, to prevent inadvertent injury to personnel when the hitch is not being used. An upstanding dome is provided for use with hitches of the type having a ball. The dome incircles the ball, and in addition provides a clearance space above the top of the ball, such that the cover can yield when jarred by the knee or leg of a person, thereby preventing injury. The cover has a base which is preferably oversize with respect to the dimensions of the hitch bar, and is provided with internal ribs or other cushinong structures that are yieldable. The ribs engage the surface of the bar such that when the cover is inadvertently bumped, the ribs yield, again preventing injury to the leg of a person. The cover also serves to protect parts of the hitch from corrosion.

3 Claims, 4 Drawing Sheets

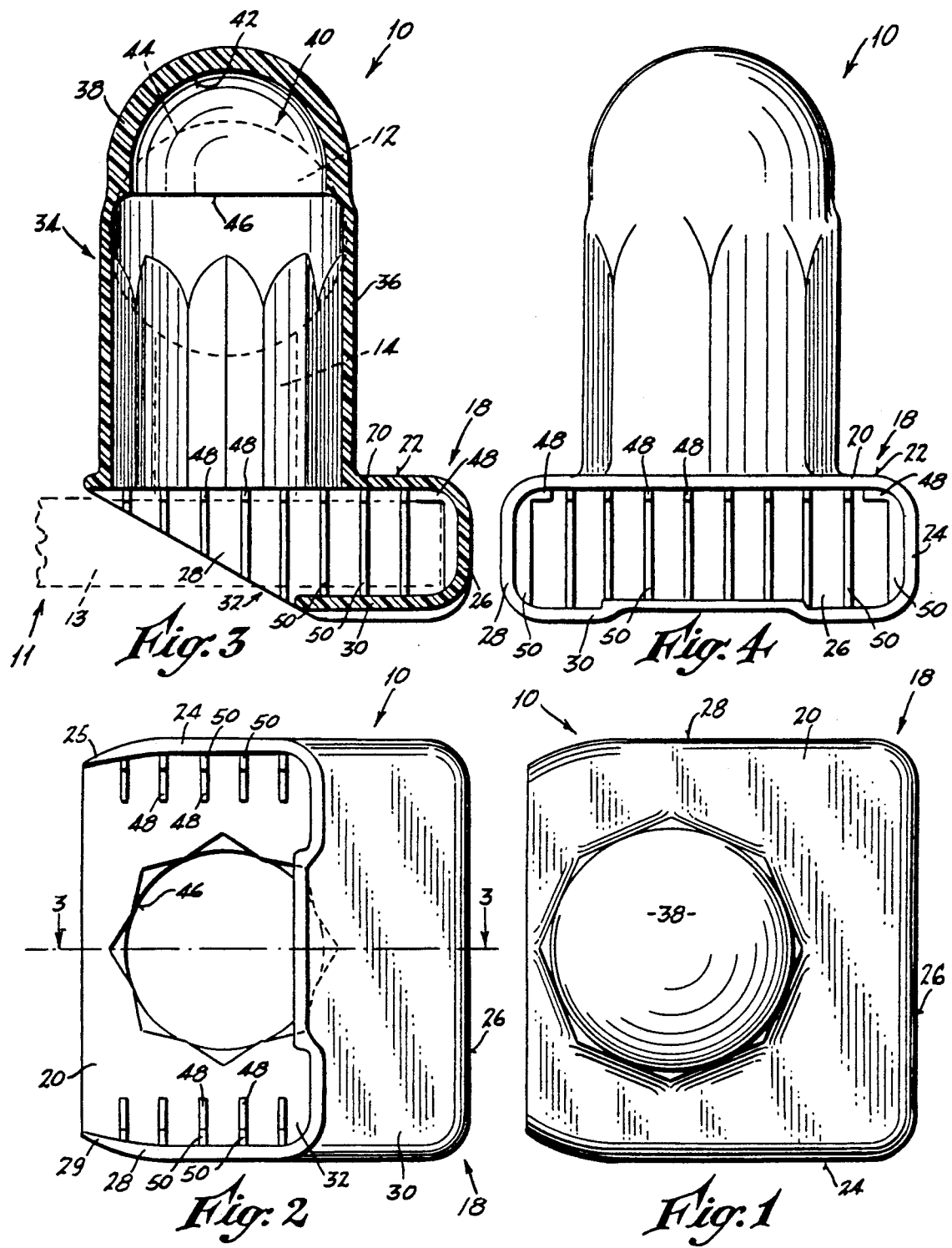

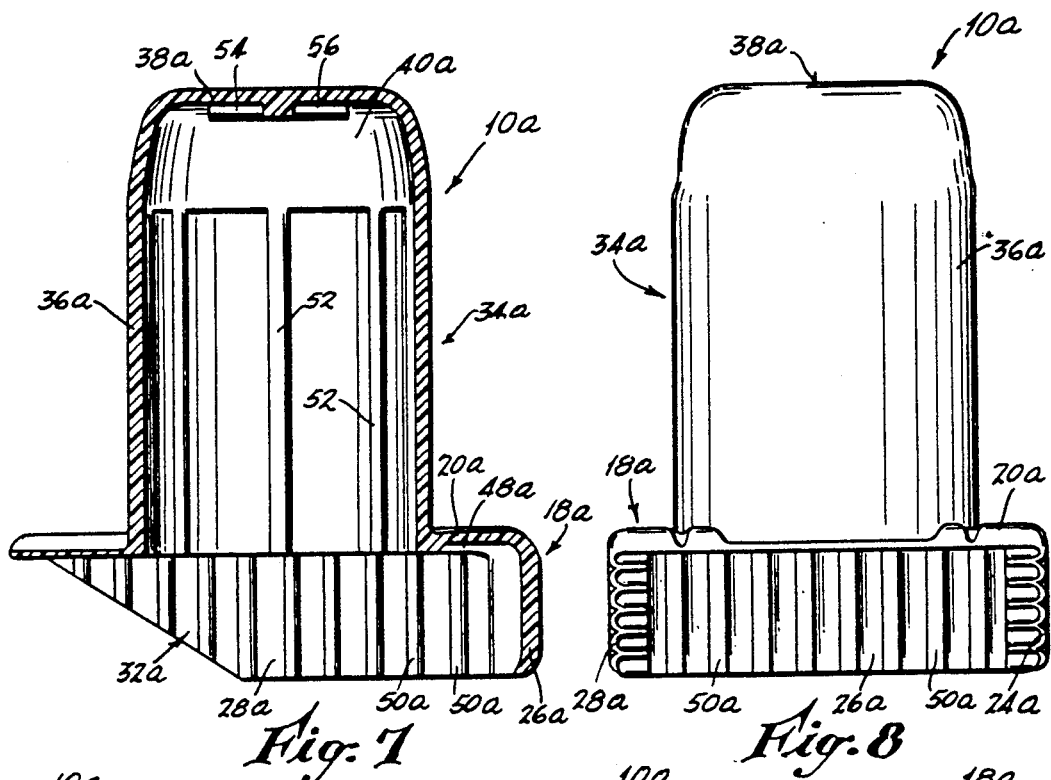
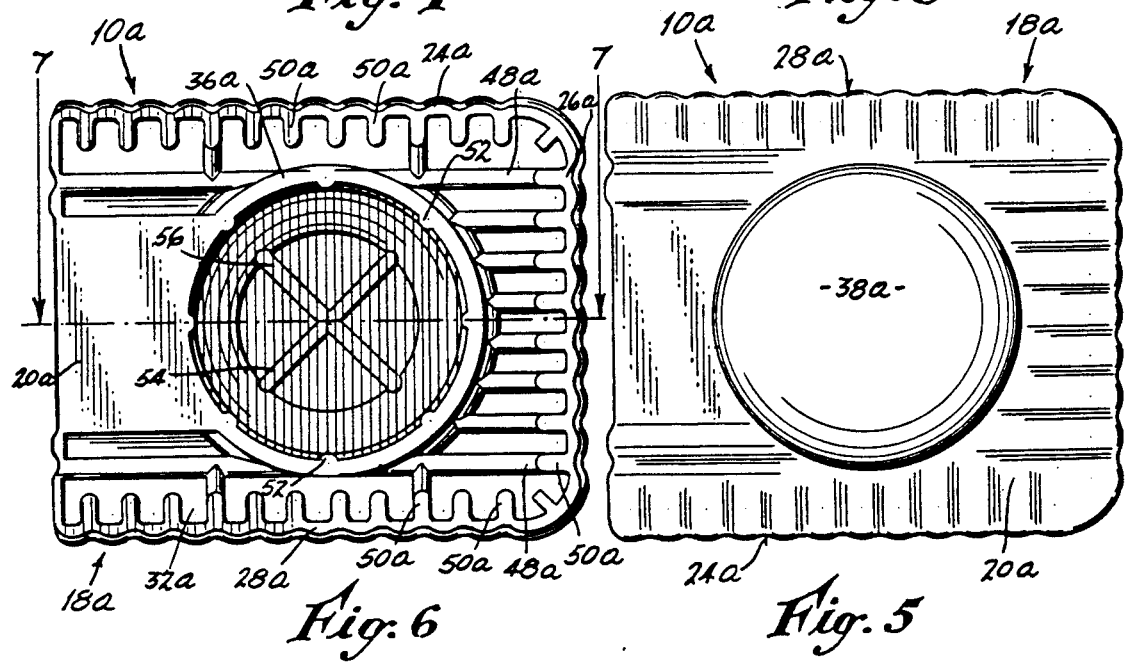

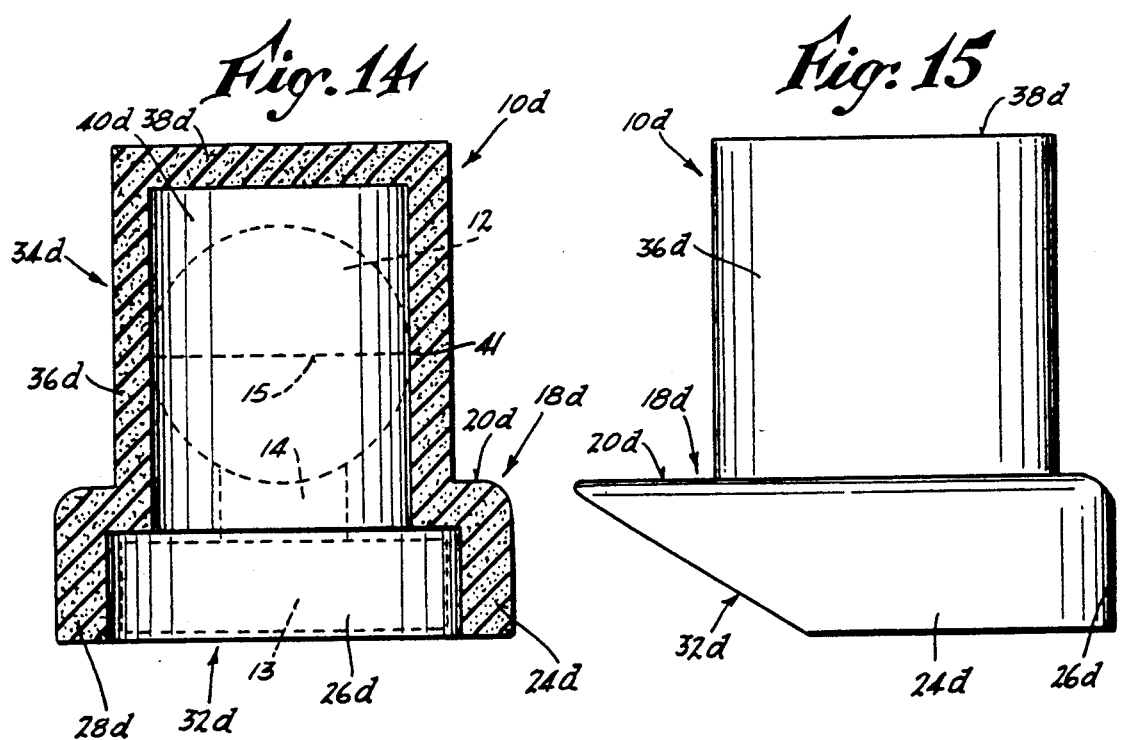

PROTECTIVE COVER FOR A TRAILER HITCH

CROSS REFERENCES TO RELATED APPLICATIONS

The present application is a continuation-in-part of, and claims the benefit under 35 USC 120 of my copending application U.S. Ser. No. 07/258,648 filed Oct. 17, 1988, now U.S. Pat. No. 4,995,968 dated Sept. 11, 1990.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to covers for trailer hitches, and more particularly to devices of the type intended to prevent injury to personnel working in the vicinity of a hitch, especially that resulting from inadvertent bumping of the hitch by a person's leg or knee.

2. Description of the Related Art Including Information Disclosed Under 37 CFR §§1.97-1.99

The hazards associated with existing trailer hitches are generally well known to anyone who has worked with them; all too often, the hitches are susceptible of being inadvertently bumped by one's kneecap or leg. The injury, while not necessarily serious, is usually most annoying and painful.

In an effort to avoid this, plastic or rubber covers have been designed, which go over the ball of the hitch when it is not being used. These covers consist essentially of a cup-like structure having a size which fits snugly over the ball. The material is generally rubber or plastic. Although these covers provide some degree of protection, the thickness of the material of which the cover is made is usually insufficient to absorb much of the shock of the bump. Also, in some cases the covers are difficult to install. Accordingly there has existed a need for improvement over the concept of employing a simple cup-like cover piece.

SUMMARY OF THE INVENTION

The above disadvantages and drawbacks of prior trailer hitch covers are obviated by the present invention, which has for one object the provision of a novel and improved cover which is extremely simple in its construction, and which provides significantly improved protection against inadvertent injury to personnel when a trailer is not connected to the hitch.

A related object of the invention is to provide an improved trailer hitch cover as above set forth, which can be readily applied and removed without the use of special tools or equipment.

Still another object of the invention is to provide an improved trailer hitch cover as above characterized, which is rugged, and which can be readily molded of plastic or rubber as a single piece, thereby keeping the manufacturing cost as low as possible.

Yet another object of the invention is to provide an improved trailer hitch cover of the kind indicated, which requires no assembly or skilled labor in its fabrication or use.

A still further object of the invention is to provide an improved trailer hitch cover as outlined above, which is adaptable, essentially without modification, to hitches of the box-end type as well as hitches of the kind incorporating a ball.

The above objects are accomplished, in one embodiment, by a cover for a trailer hitch comprising a base portion adapted to at least partially surround the hitch bar, an upstanding dome portion connected with the base portion and encircling the ball of the hitch, and wherein the dome portion has a side wall with a cross-sectional configuration that enables it to readily expand, if necessary, upon being press-fitted over the ball. A head-space is provided in the dome portion, above the area occupied by the ball, such that upon impact, the dome portion's upper wall can, with some resistance, yield inwardly prior to coming into contact with the ball, thereby minimizing injury to a person's knee, leg, arm, etc.

Preferably a single cover configuration can be employed with either ball-type or box-end type hitches, thus making the unit universal.

Other features and advantages will hereinafter appear.

BRIEF DESCRIPTION OF THE DRAWINGS

FIG. 1 is a top plan view of the improved trailer hitch cover of the invention, illustrating in plan the top wall of the dome portion, and also the top wall of the base portion.

FIG. 2 is a bottom plan view of the cover of FIG. 1.

FIG. 3 is a section taken on the line 3—3 of FIG. 2; shown in dotted outline is a trailer hitch having a base portion and ball.

FIG. 4 is a front elevation of the cover, illustrating the cavity in the base portion for receiving the hitch bar.

FIG. 5 is a top plan view of a modified trailer hitch cover having one side of the base portion essentially completely open, constituting another embodiment of the invention.

FIG. 6 is a bottom plan view of the cover of FIG. 5.

FIG. 7 is a section taken on the line 7—7 of FIG. 6.

FIG. 8 is a rear elevation of the cover of FIGS. 5-7.

FIG. 14 is a vertical section of a further modified hitch cover, constituting another embodiment of the invention, and FIG. 15 is a side elevation of the hitch cover of FIG. 14.

DESCRIPTION OF THE PREFERRED EMBODIMENTS

Figure 9:
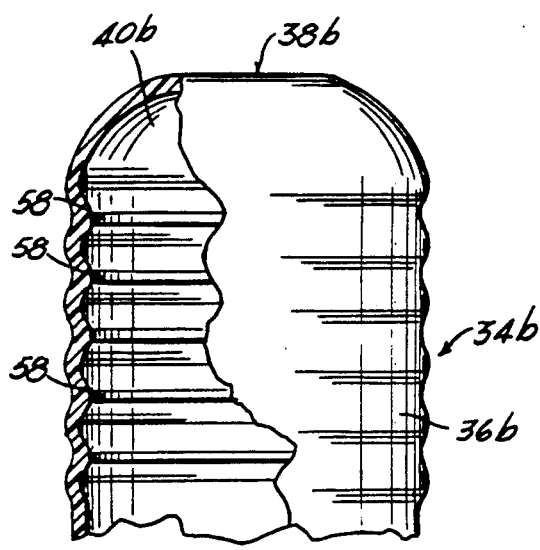
FIG. 9 is a fragmentary side elevational view of a further modified cover, incorporating a dome with multiple sealing or seating rings, and having a base configuration otherwise similar to the cover of FIGS. 5-8.

By way of example, referring to FIGS. 1-4 and in accordance with the present invention there is provided a novel and improved cover for a trailer hitch, designated generally by the numeral 10. Shown dotted in FIG. 3 is a trailer hitch 11 of the type having a ball 12 and comprising a hitch bar 13 and connecting stem 14 which latter can take the form of a bolt or stud that is secured to the bar 13.

The cover 10 comprises a base portion 18 having a top wall 20 with an upper surface 22, side walls 24, 26 and 28, and a bottom wall 30, the base portion 18 being open at one side location to thereby define a cavity 32 of generally box-like configuration. Side walls 24 and 28 have re-entrant terminal portions 25 and 29, respectively.

Extending upwardly from the base portion 18 is a rounded dome portion 34, having an expandable side wall 36 and a top wall 38 which latter, in the illustrated example, is semi-spherical. According to the invention, the side wall 36 can have a polygonal cross-section; in the illustrated example this wall has eight sides, thereby enabling a limited expansion in radially outward directions when press-fitting the cover 10 over the ball 12 of the hitch 11.

An important feature of the invention is the provision of a well-defined enclosed, sealing head-space 40 between the lower surface 42 of the dome's top wall 38 and the upper surface 44 of the ball 12. Preferably the cover 10 is fabricated of resilient material such as polypropylene, and with the thickness shown, the wall 38 will be reasonably stiff but not rigid. Impact forces applied to the wall 38, as by bumping from a person's knee or leg, will cause limited inward movement of the wall 38 against its resilience and in many cases against the pressure of air trapped and sealed sin the head space 40. In effect, the provision of the head-space 40 thus causes impacts of the type noted to be cushioned, thereby minimizing the chance of injury to personnel.

This action relates to another feature of the invention involving the provision of an annular sealing seat 46 at the junction of the semi-spherical wall 38 and the side wall 36, whereby the head space 40 constitutes an essentially air-tight chamber with the upper surface 44 of the ball 12. Air trapped in the chamber 40 will inhibit complete yielding or collapse of the wall 38; instead, there will result a desirable cushioning effect, as noted above, and which is similar to the effect of depressing a localized area on an air-filled ball, such as a basketball or tennis ball.

Even if the seal between the seat 46 and ball 12 is not completely air-tight, the seat 46 nevertheless constitutes a stop or positioning seat or shoulder to prevent the top wall 18 from readily collapsing and coming into contact with the upper surface 44 of the ball 12.

Other forms of stop shoulders could be provided, such as a series of nibs (not shown) spaced circumstantially around the inner surface of the side wall, etc.

A further important aspect of the invention is the raised positioning of the wall 38, as defined by the distance between it and the top wall 20 of the base portion 18. The side wall 36 of the dome portion 34 maintains the head-space 40, since in order for the wall 38 to contact the upper surface 44 of the ball 12, at least part of the side wall 36 would have to buckle or collapse, which has been found to be unlikely.

As illustrated, the base portion 18 is open at one side, forming the cavity 32, in order to accept the hitch bar 13. By the present invention, the base portion 18 is made oversize with respect to the dimensions of the bar 13, and a series of projections or fins 48, 50 is provided on the inner surfaces of the top wall 20 and side walls 24, 26 and 28 respectively. The fins 48, 50 have the approximate dimensions illustrated, and define between them a series of spaces; the fins thus maintain both the top wall 20 and side walls 24, 26 and 28 in spaced relation with respect to the hitch bar 13.

The fins 48, 50 are preferably integral with the respective walls 20, 24, 26 and 28, and the spaces so formed provide a desirable cushioning if the walls are inadvertently bumped by personnel. Stated differently, the fins 48, 50 impart a controlled yieldability to the top wall 20 and side walls 24, 26 and 28, thereby minimizing possible injury from outside contact with these areas of the cover.

The fins 48, 50 extend inwardly as shown. Fins 50 on the side walls 24, 26 and 28 are vertical, and the fins 48 on the top wall 20 are horizontal; refer to FIGS. 2-4.

The friction of the fins 48, 50 on the bar 13 is effective in retaining the cover 10 in position, thereby minimizing the possibility of its becoming lost or misplaced.

Another embodiment of the invention is shown in FIGS. 5-8, wherein like reference numerals having the suffix "a" have been assigned to similar components. A modified cover 10a is provided, comprising a base portion 18a having a top wall 20a and side walls 24a, 26a, and 28a. The base portion 18a is open at one side location to thereby define the cavity 32a.

Extending upwardly from the base portion 18a is a rounded dome portion 34a having a generally cylindrical side wall 36a with a series of internal, vertical stiffening ribs 52, and a top wall 38a.

There is provided a well-defined enclosed, sealing headspace 40a between the lower surface of the top wall 38a and the upper surface of the ball 12 (not shown in FIGS. 5-8). Impact forces applied to the wall 38a as by bumping from a person's knee or leg, will cause limited inward movement of the wall against its resilience. The provision of the head-space thus causes such impacts to be cushioned, thereby minimizing the chance of injury to personnel.

As in the previous embodiment, the raised positioning of the wall 38a as defined by the distance between it and the top wall 20a of the base portion 18a maintains the head-space 40a.

By the invention, the base portion 18a is made oversize with respect to the dimensions of the bar 13, and a series of projections or fins 48a, 50a is provided on the inner surfaces of the top wall 20a and side walls 24a, 26a and 28a respectively. The fins have the approximate dimensions illustrated, and define between them a series of spaces; the fins thus maintain both the top wall 20a and side walls 24a, 26a and 30a in spaced relation with respect to the hitch bar 13.

The fins 48a and 50a extend inwardly as shown. Fins 50a on the side walls are vertical, and the fins 48a on the top wall are horizontal.

On the inner surface of the top wall 38a of the dome portion are two stiffening ribs 54 and 56, forming an "X". These provide the desired rigidity to this area.

The construction shown in FIGS. 5-8 has the distinct advantage of ease of molding, since there has been eliminated the bottom wall which existed in the first embodiment. Stripping of the cured article from the mold is thus facilitated.

Still another embodiment of the invention is illustrated in FIG. 9, wherein like reference numerals having the suffix "b" have been assigned to similar components. In this embodiment, there is provided a modified dome portion 34b, which may or may not be adapted for use with an integral base similar to that of FIGS. 5–8. In addition to the dome portion's top wall 38b, there is a generally cylindrical side wall 36b. By the invention, the inner surface of this side wall is provided with a series of vertically spaced annular ribs 58, any one of which is intended to form a seat or seal with the large diameter portion of the trailer hitch ball (12, FIG. 3). Regardless of the location of the ball 12 with respect to the hitch base, one or two of the ribs 58 will fit tightly against the ball, creating an air-lock in the chamber 40b, as in the first embodiment. The air-lock provides a cushioning effect to the dome portion 34b, by limiting the tendency for the top wall 38b thereof to collapse when impacted by forces external of the cover.

In other respects the embodiment of FIG. 9 can be similar to that of FIGS. 5–8.

Alternately, the construction of FIG. 9 could be employed without a base; instead, the construction would resemble an inverted cup with a lip which might or might not extend to and engage the hitch bar 13.

Figure 11:
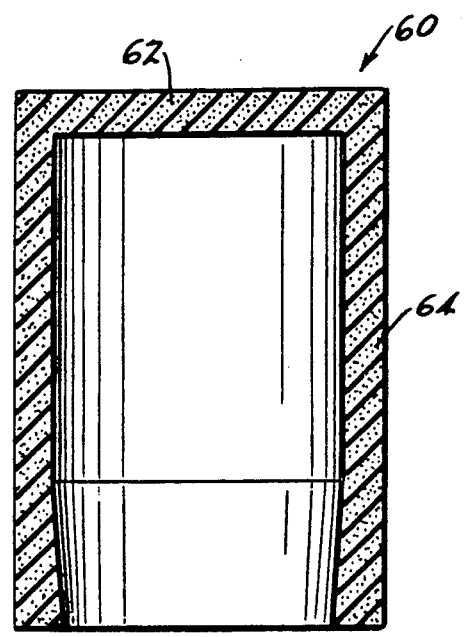
FIG. 11 is a section taken on the line 11—11 of FIG. 10.
Figure 10:
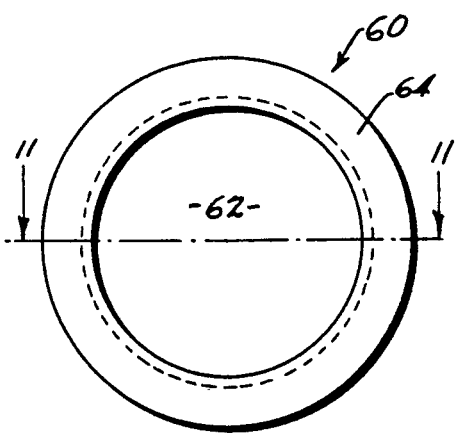
FIG. 10 is a bottom plan view of a further modified cover, constituted of foam rubber or rubber-like substance, constituting yet another embodiment of the invention.

Still another embodiment of the invention is shown in FIGS. 10 and 11, illustrating a greatly simplified cover. Essentially the cover comprises an inverted cup 60 having a top wall 62 and a side wall 64. Preferably the cup 60 is constituted of foam rubber or foam rubber-like substance, and the side wall 64 of the cup is sufficiently thick to provide a cushion between the ball of the hitch and an object (i.e. a person's knee) which might impact on the cover 60 from its exterior. The inner diameter of the cup 60 is preferably made to fit snugly around the ball. The area of the side wall adjacent the lip of the cup can be thickened slightly, as shown in FIG. 11, to improve the retention.

Figure 12:
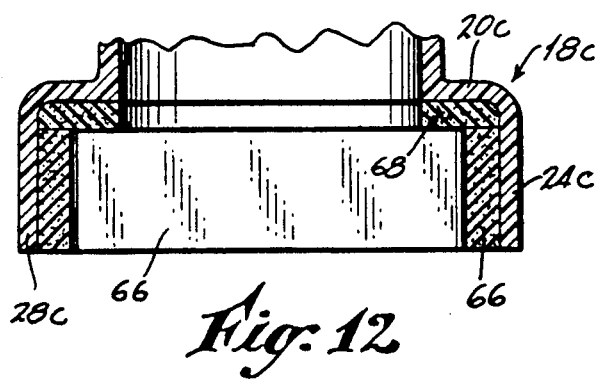
FIG. 12 is a fragmentary rear elevation similar to that of FIG. 4, of a still further modified cover, constituting yet another embodiment of the invention.
Figure 13:
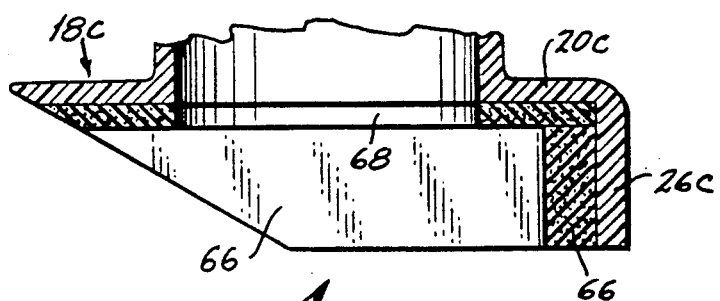
FIG. 13 is a fragmentary vertical section of the cover of FIG. 12.

Still another embodiment of the invention is shown in FIGS. 12 and 13, wherein like reference numerals having the suffix "c" have been assigned to similar components.

By the invention, there is applied to the inner surface of the top wall 20c and side walls 24c, 26c and 28c of the base portion 18c strips 66 and a cutout 68 of thin foam material in order to provide the desired cushioning. A single strip 66 can be wrapped along the inside of the three side walls 24c, 26c, and 28c, with a fourth piece 68 of foam material secured to the inside of the top wall 20c. Attachment can be made by means of suitable cement or glue, or alternately by employing adhesive-backed foam strips similar to those used for weatherstripping windows and doors in buildings or residences.

The dome structure associated with this base would typically be similar to that of FIGS. 1–4 or 5–8; accordingly details of these structures need not be repeated.

Another embodiment of the invention is illustrated in FIGS. 14 and 15, wherein like reference numerals having the suffix "d" have been assigned to similar components. A modified cover 10d is provided comprising a base portion 18d having a top wall 20d and side walls 24d, 26d and 28d. The base portion 18d is open at one side location as shown. The top wall 20d and side walls 24d, 26d, and 28d thus form a cavity 32d or channel-like enclosure means that overlies the upper surface of the hitch bar 13 and the side surfaces thereof. Extending upwardly from the base portion 18d is a rounded dome portion 34d having a generally cylindrical side wall 36d. There is provided a well-defined enclosed, sealing head-space 40d between the lower surface of the top wall 38d and the upper surface of the ball 12, as in FIG. 14.

The upstanding ball 12 of the hitch is seen to have a smooth and unbroken circumferential latitudinal zone 15, FIG. 14, and by the invention the side wall 36d of the dome has a generally annular sealing surface 41 for essentially air-tight sealing engagement by the ball 12 of the hitch at a location substantially at the said latitudinal zone 15, so as to form a yieldable air-tight head space between the trailer hitch ball 12 and the top wall 38d of the dome when the cover is installed. Impact forces applied to the wall 38d as by bumping from a person's knee or leg, will cause limited inward movement of the wall which are opposed by its resilience, as well as being opposed by the pressure seal formed between the wall 38d and ball 12. The provision of the head-space thus causes such impacts to be cushioned, thereby minimizing the chance of injury to personnel.

The dome and base portion are preferably constituted of resilient material, and can advantageously be made of either foam rubber or foamed plastic material. Preferably, the dome and base portion are molded as a single integral piece.

From the above it can be seen that I have provided novel and improved cover constructions which have important features that minimize injury from inadvertent contact with an exposed trailer hitch. The cover can be molded as a single piece, including the fins illustrated in the first two embodiments. It is adaptable for use with trailer hitches of the ball-type, or else it can be employed with a box-end type hitch in which the area inside the dome portion 34 (FIGS. 1–4) would be unoccupied. Accordingly the unit can be universal for a given hitch size.

The device is thus seen to represent a distinct advance and improvement over previously known covers of this kind.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

What is claimed is:

1. A safety cover for a trailer hitch comprising a hitch ball and a hitch bar, said hitch bar having an upper surface and having side surfaces, the safety cover comprising in combination:
   a) a molded, resilient base portion comprising substantially channel-like enclosure means having a top wall portion and side wall portions, to overlie the upper surface of the hitch bar and the side surfaces thereof, said base portion further having an opening to enable the hitch bar to be received in the channel-like enclosure means, and
   b) an upstanding hollow dome having a top wall and a side wall connected therewith, said dome and base portion being molded integrally with one another and constituting a cover for both the hitch ball and the hitch bar, to prevent injury to personnel resulting from inadvertent contact with the trailer hitch.

2. The invention as set forth in claim 1, wherein:
   a) said base portion and dome comprise material selected from the group consisting of foam rubber and foam plastic.

3. The invention as set forth in claim 1, wherein:
   a) said dome is constituted of resilient material to enable it to yield a limited extent when subjected to impact.

* * * * *